United States Patent [19]

Sogo et al.

[11] 4,195,799
[45] Apr. 1, 1980

[54] SYSTEM FOR GUIDING FLYING VEHICLES WITH LIGHT BEAM

[75] Inventors: Hiroshi Sogo; Nobuo Yoshino, both of Utsunomiya, Japan

[73] Assignee: Fuji Jukogyo Kabushiki Kaisha, Japan

[21] Appl. No.: 751,998

[22] Filed: Dec. 17, 1976

[30] Foreign Application Priority Data

Dec. 29, 1975 [JP] Japan .................. 50-156298

[51] Int. Cl.$^2$ .......................... F41G 7/00; F41G 9/00
[52] U.S. Cl. .................................. 244/3.13; 244/3.16
[58] Field of Search .............................. 244/3.13, 3.16

[56] References Cited

U.S. PATENT DOCUMENTS

| 3,501,113 | 3/1970 | Maclusky | 244/3.13 |
| 3,860,199 | 1/1975 | Dunn et al. | 244/3.13 |
| 4,014,482 | 3/1977 | Esker et al. | 244/3.13 |
| 4,030,686 | 6/1977 | Buchman | 244/3.13 |

FOREIGN PATENT DOCUMENTS 2658689  7/1977  Fed. Rep. of Germany .......... 244/3.13

Primary Examiner—Stephen C. Bentley
Assistant Examiner—Thomas H. Webb
Attorney, Agent, or Firm—Robert E. Burns; Emmanuel J. Lobato; Bruce L. Adams

[57] ABSTRACT

A method for guiding a flying vehicle having a light receiver by directing a spirally scanning beam at the light receiver. A repetition reference time of the scanning of the light beam is stored in the flying vehicle before it is launched. After the flying vehicle has been launched the radiation angle of the spirally scanning light beam is controlled according to the lapse of time after launching of the flying vehicle so as to maintain a scanning area of the scanning light beam on the light receiver constant. In flight, the flying vehicle is guided so as to be on the center of the light beam according to information on a displacement of the flying vehicle from the center of the light beam and information on a displacement angle from a reference axis of the light beam determined from a period of time during which the light receiver receives the light beam.

4 Claims, 18 Drawing Figures

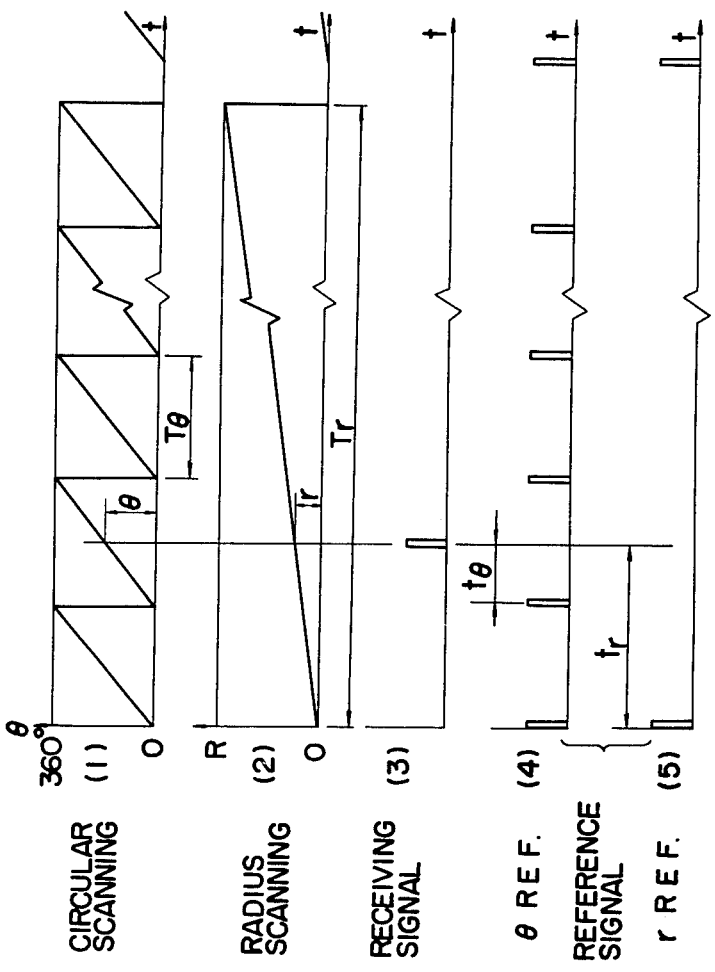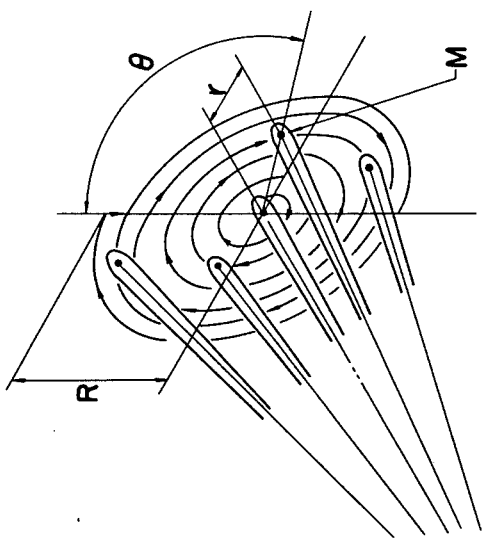

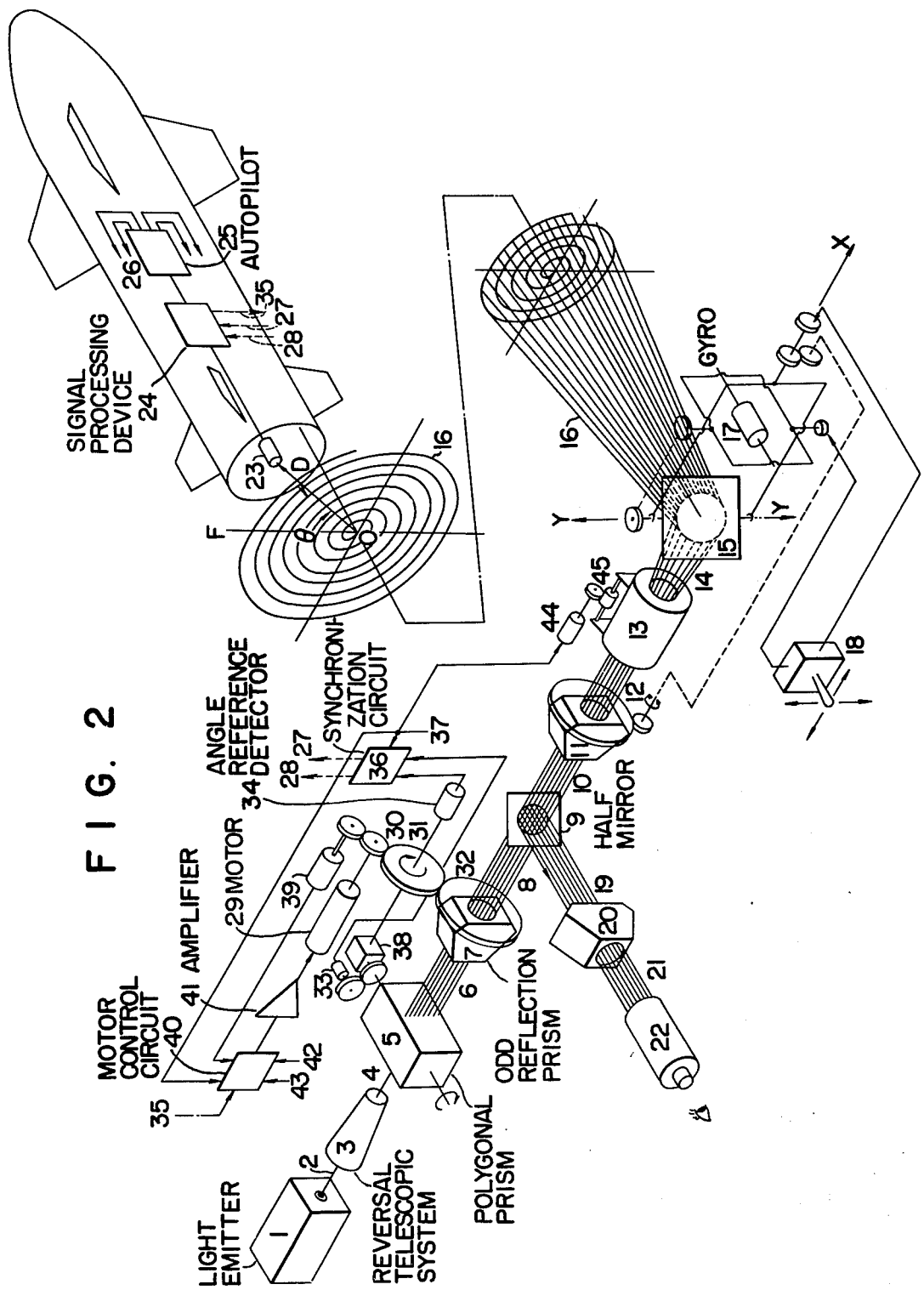

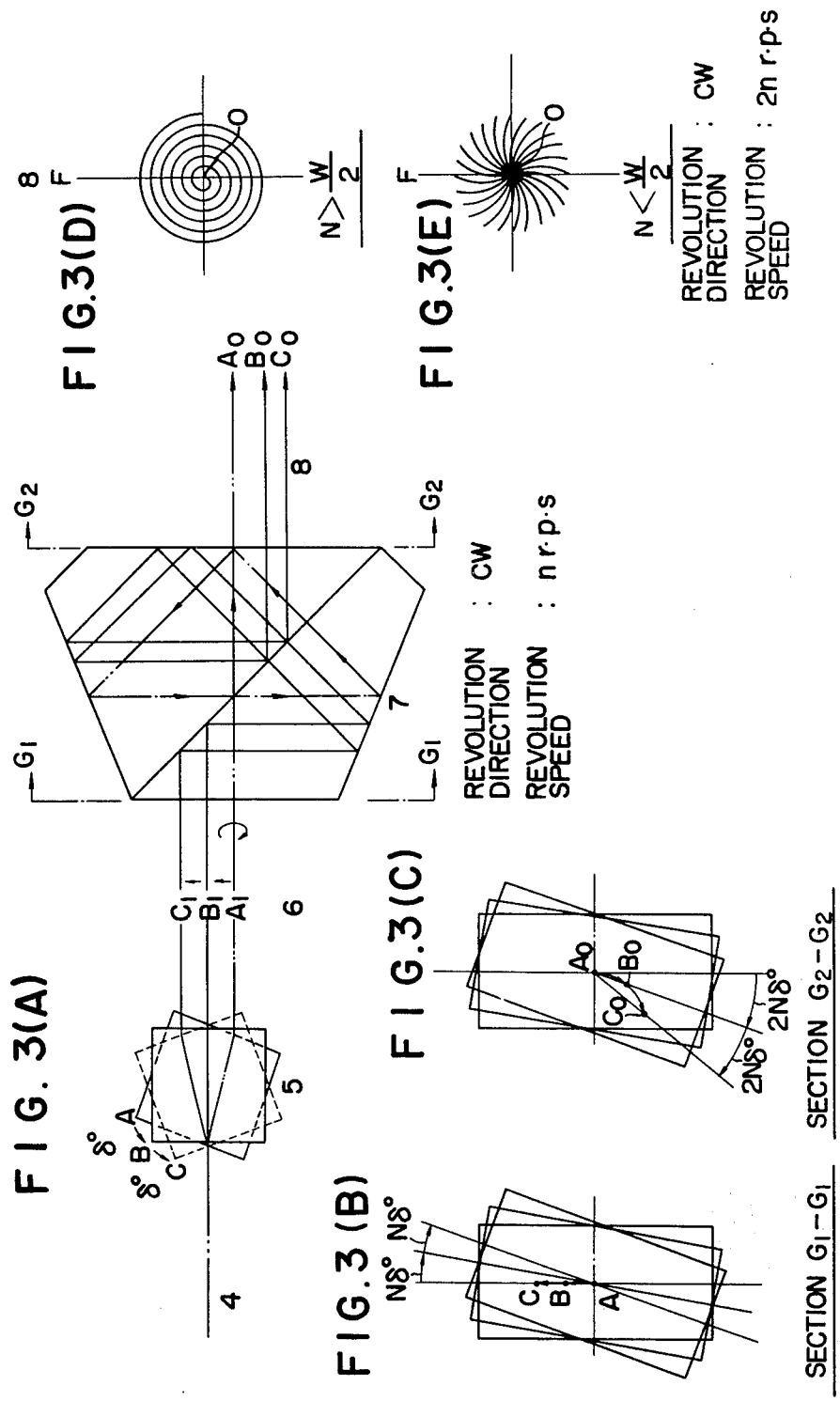

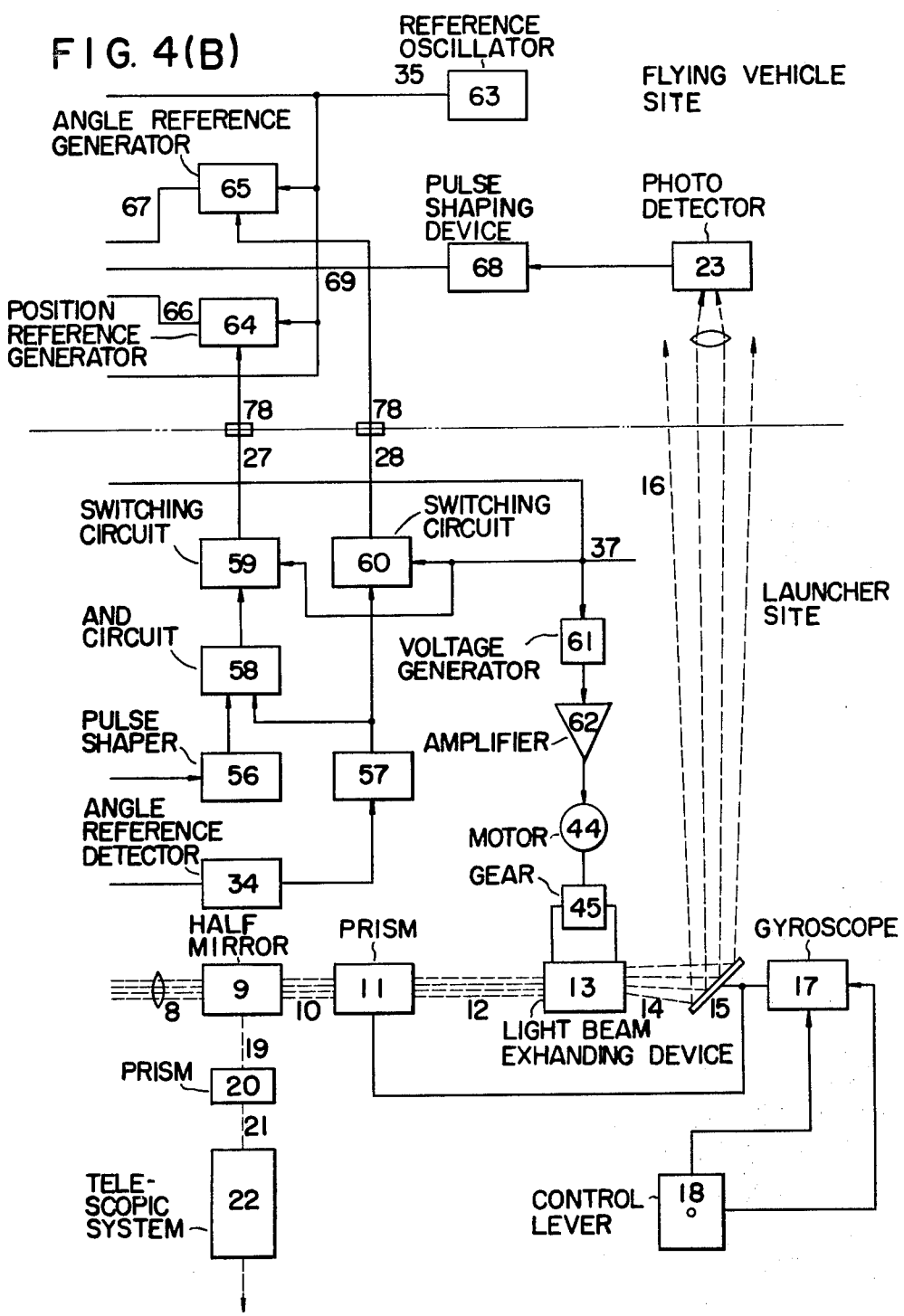

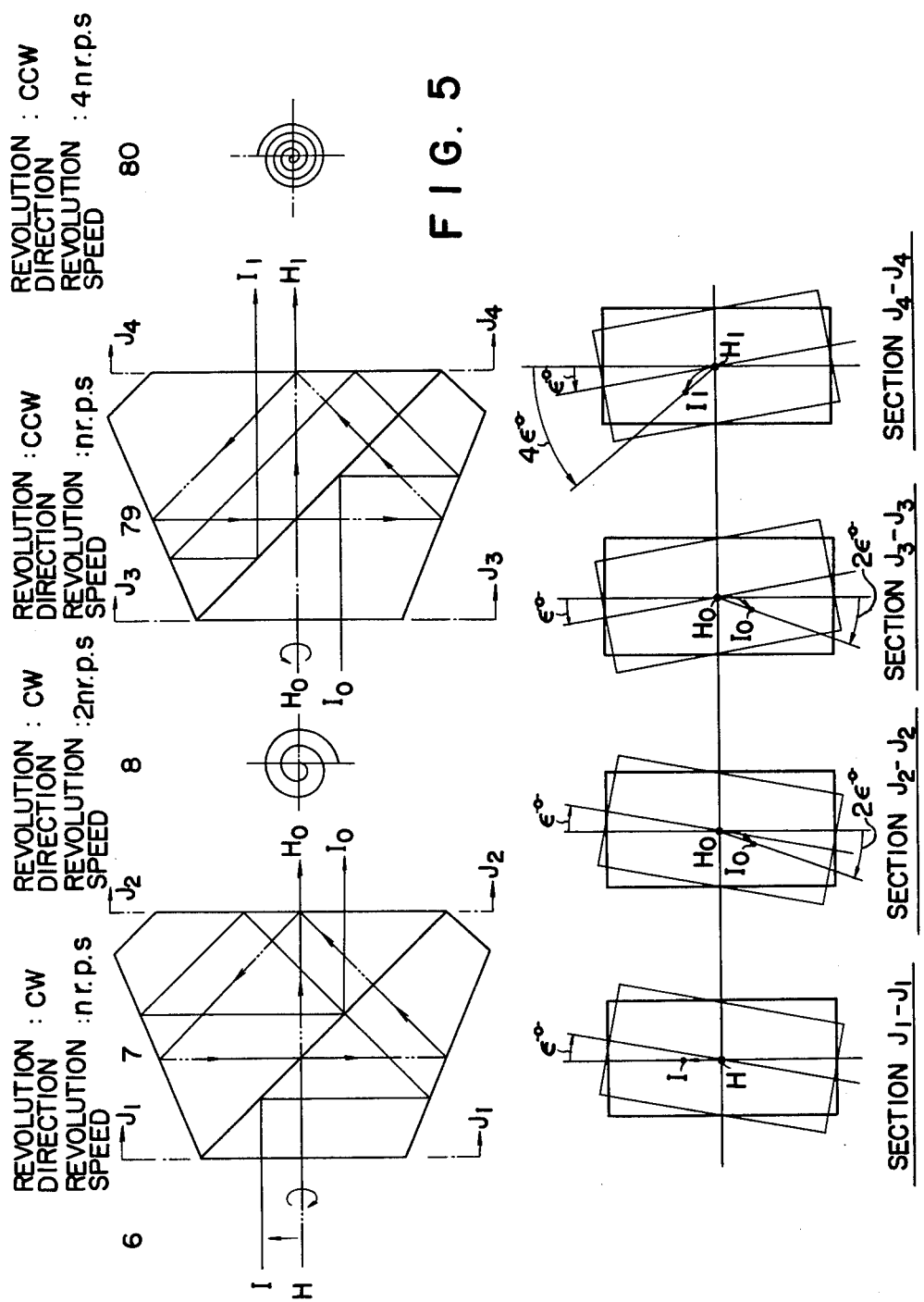

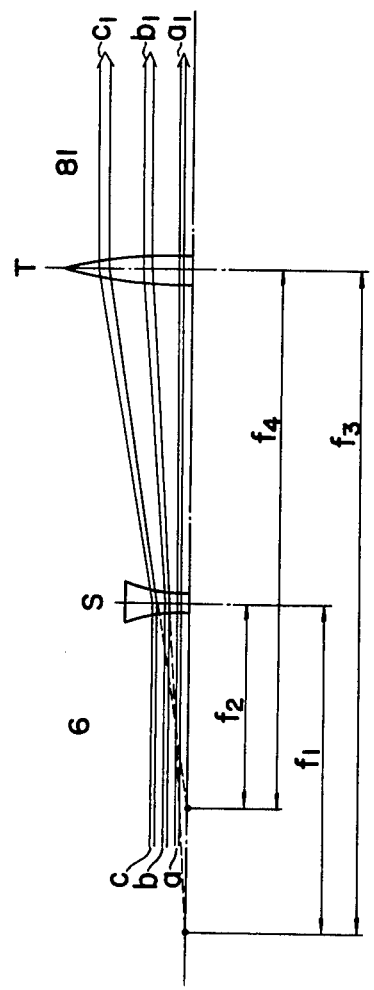

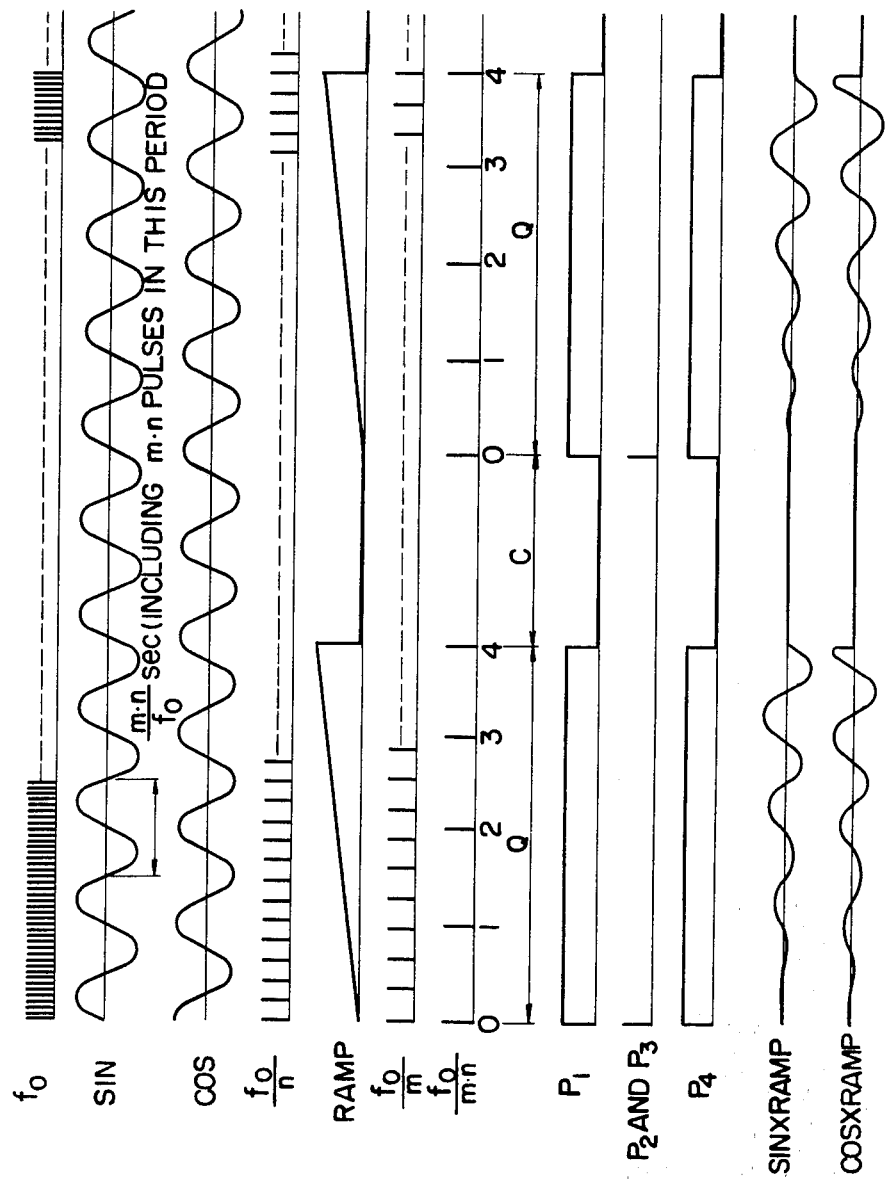

SYSTEM FOR GUIDING FLYING VEHICLES WITH LIGHT BEAM

BACKGROUND OF THE INVENTION

This invention relates to a system for guiding in which flying vehicles suuch as guided missiles are guided by a beam rider system, (hereinafter referred to as "light beam guide systems" when applicable).

A beam rider system using light wave for guiding a flying vehicle is superior to a passive system in which a guiding operation is performed by homing on infrared rays emitted from the target, and to an active or semi-active system in which a radio wave is emitted to the target from the flying vehicle itself or from a position different from the launcher's position, and the radio wave reflected by the target is detected by the flying vehicle to home on the target, in that as the light beam has a sharp directivity, the beam rider system using a light beam is scarcely interfered with by radio waves or light beams from the target.

However, since the beam rider system utilizes a light beam, it is necessary to increase the intensity of the light beam so as to distinguish the former from natural light, and furthermore it is required to apply a light beam having a certain diameter to a receiver of the flying vehicle.

These two requirements are contradictory to each other if the power of the light beam is maintained constant. More specifically, if the diameter of the beam is decreased to increase the intensity thereof, the size of the spot of the light beam formed on a receiver of the flying vehicle is decreased; however, the intensity of the light beam must be decreased if it is intended to increase the size of the spot of the light beam to a predetermined value. This is one of the drawbacks of the conventional beam rider system.

Furthermore, in the beam rider system, no matter where the flying vehicle is in a range predetermined from the center of the light beam, information on the displacement and its direction with respect to the center of the light beam must be obtained from signals received by the receiver of the flying vehicle. However, in order to obtain such information it is necessary to provide an intricate process, namely, modulation of a light beam. Especially in the case where the scanning is conducted with a light beam having these two pieces of information, it is required to increase the scanning speed for the response of the flying vehicle. If the scanning speed is increased, the receiving period of the scanning beam becomes too small for the transmission of the two pieces of information. This is a severe limitation on the beam rider system.

SUMMARY OF THE INVENTION

Accordingly, an object of this invention is to provide a light beam guide system for a flying vehicle, which is capable of applying a light beam sufficiently high in intensity to a receiver of the flying vehicle, and which is capable of maintaining the scanning area of the light beam at a required value.

More specifically, an object of the invention is to provide a light beam guide system for a flying vehicle, in which a reference time corresponding to the scanning period of a light beam is stored in the flying vehicle, and information on a displacement from the center of the light beam and information on a displacement angle with respect to a reference axis of the light beam are applied to the flying vehicle.

The foregoing object and other objects of the invention have been achieved by the provision of a system for guiding a flying vehicle with a light beam in which a relatively thin light beam emitted by a light emitter provided on a launcher site is allowed to scan space spirally or radially by scanning said light beam in the radial direction from one end to the other, and while turning the scanning direction circularly, and a radiation angle of said light beam is suitably expanded, so as to apply said light beam to a receiver of said flying vehicle, whereby said flying vehicle is guided to be on the center of said scanning light beam.

The nature, principle, and utility of the invention will become more apparent from the following detailed description and the appended claims when read in conjunction with the accompanying drawings.

BRIEF DESCRIPTION OF THE DRAWINGS

In the accompanying drawings:

FIGS. 1(A) and 1(B) are principle illustrations for a light beam guide system for a flying vehicle according to this invention;

FIG. 2 is a diagram for a description of a principle of a light beam guide system for a flying vehicle according to this invention;

FIGS. 3(A) through 3(E) are explanatory diagrams for a description of a light beam spiral scanning system employed in this invention;

FIGS. 4(A) and 4(B) are two parts of a block diagram illustrating a control system on a laucher site and on a flying vehicle site;

FIG. 5 is an explanatory diagram for a description of a means for increasing the rotation of a scanning light beam; and FIG. 6 is also an explanatory diagram for a description of a scanning light beam whose diameter is gradually increased.

FIG. 9 is a time chart of signals described in FIG. 8;

DETAILED DESCRIPTION OF THE INVENTION

Figure 4A:
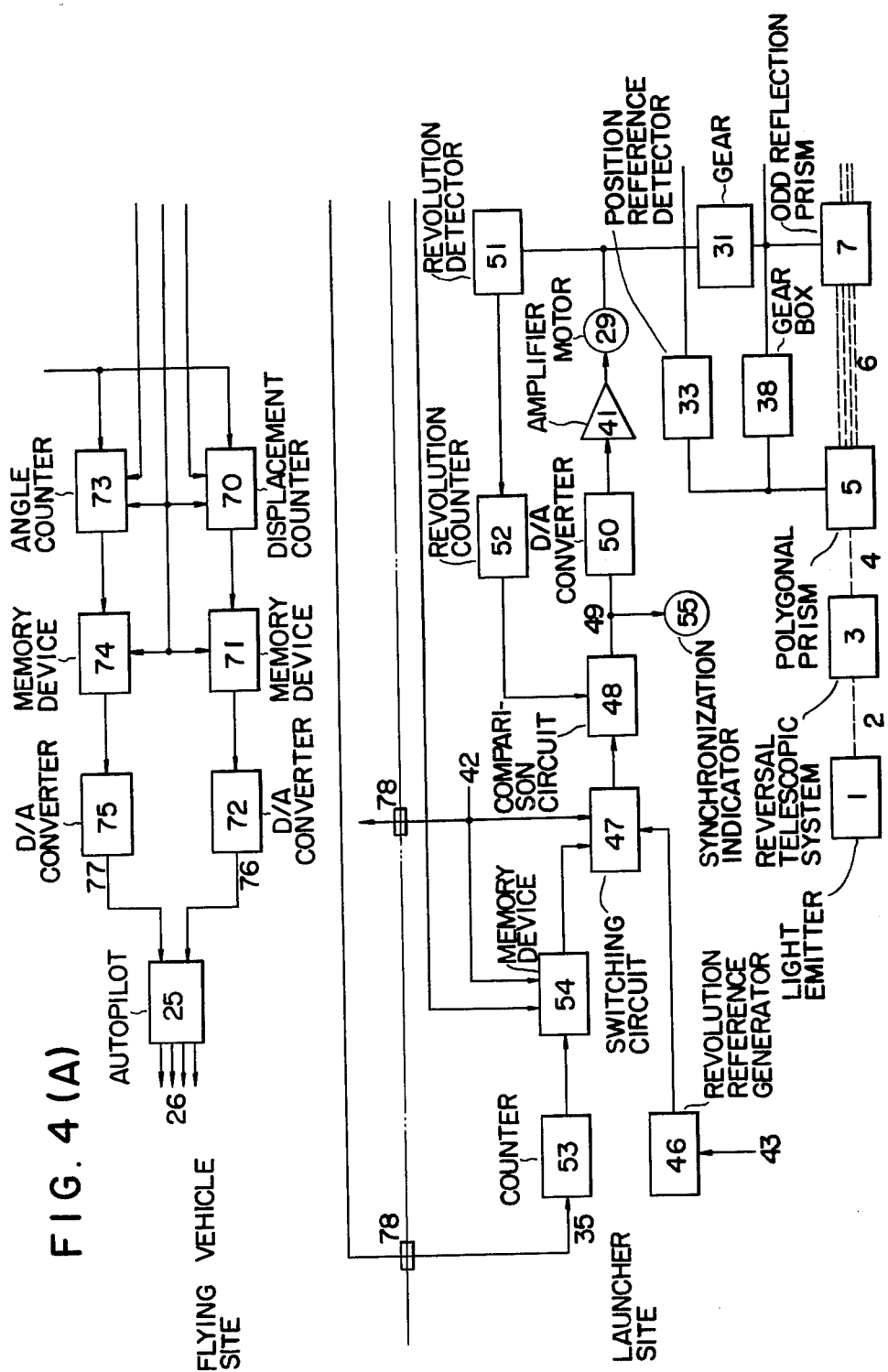

First, a light beam guide system for a flying vehicle according to this invention will be theoretically described.

FIG. 1 illustrates the principle of this light beam guidance system. A spiral scanning pattern is illustrated in FIG. 1(A). In FIG. 1(A), a light beam is scanned to in a radial direction from center, while the beam is scanning circularly and returns to the center to repeat the scanning. When the flying vehicle is at a position M defined in polar coordinate of r and $\theta$, corresponding timing charts of scanning and receiving light beams are illustrated in FIG. 1(B). In FIG. 1(B), the relation of angle $\theta$ corresponding to elapsed time t is shown for circular scanning (1), the relation of radius r corresponding to elasped time t is shown for radius scanning (2), $\theta$ reference pulses in the flying vehicle corresponding to elapsed time t are shown in θ REF (4), r reference pulses in the flying vehicle corresponding to elapsed time t are shown in r REF (5). In the timing charts (1), (2), (4) and (5), the time position of θ REF corresponding to zero degree (same as 360 degrees) position of circular scanning and the time position of r REF corresponding to start position from zero radial of radius scanning, when receiving pulse is shown in the receiving signal (3), time difference tθ between θ REF and receiving pulse is measured in the flying vehicle, θ is calculated by $$\theta = K_\theta t_\theta \quad (1)$$

where $K_\theta$ = gradient of circular scanning defined as $360/T_\theta$ and time difference $t_r$ between r REF and receiving pulse is measured in the flying vehicle, r is calculated by $$r = K_r t_r \quad (2)$$

where $K_r$ = gradient of radius scanning defined as $R/T_r$
R = maximum scanning radius of spiral scanning.
Therefore r and θ are calculated from measured time $t_r$ and $t_\theta$. θREF and r REF are generated by the clock pulses in the flying vehicle started at launching and synchronized to scanning. After the flying vehicle was launched, the flying vehicle calculates from receiving pulses only without any other information from the launcher.

As is shown in FIG. 2, a light emitter or light source 1 emits a thin light beam 2, which is changed into a thinner light beam 4 by a reversal telescopic system 3. This light beam 4 is changed into a light beam 6 which is allowed to repeatedly scan space from one end to the other for instance vertically or horizontally by rotating a polygonal prism 5. When a prism 7 in which a light beam applied thereto is reflected an odd number of times (hereinafter referred to as "an odd reflection prism") is turned around the initial direction of the light beam 6, a spiral scanning light beam 8 is obtained which moves spirally and radially from its center and returns to the center. By passing the light beam 8 through a half mirror 9, a light beam 10 including a visible ray and a guiding light beam can be obtained. In order to correct the twist of the optical axis which is caused by rotating a reflection mirror 15 around an X-axis, the light beam 10 is applied to an odd reflection prism 11 which is rotated synchronously in the direction opposite to the direction of rotation of the reflection mirror 13 around the X-axis, as a result of which a light beam 12 is obtained.

The light beam 12 is introduced into a light beam expanding device 13 so that no matter where the flying vehicle is after it has been launched, a light beam scanning area at the instant the receiver of the flying vehicle receives the light beam is maintained constant in a plane perpendicular to the central light beam. The light beam expanding device 13 is so designed that the light beam expanding angle is initially large but becomes gradually small with the lapse of time after the lunching of the flying vehicle. Thus, a light beam 14 is provided by the device 13. This light beam 14 is reflected by the reflection mirror 15, whereby it becomes a light beam 16 which is directed to the target.

The light beam 10 including the visible ray is applied to the half mirror 9, as a result of which a visible ray 19 is separated from the light beam 10. The visible ray 19 thus separated is inverted by an odd reflection prism 20, whereby a correct visible ray 21 is provided. This visible ray 21 is enlarged by a telescopic system 22, to obtain an enlarged image. A gyroscope 17 is operated by control level 18, and the reflection mirror 15 is rotated around the X-axis and Y-axis so that with the aid of the above described image, the center of the light beam 16 coincides with the moving target at all times. Thus, the center of the light beam 16 can be on the track of the moving target.

The stabilization of the center of the light beam and the center of the visible ray, regardless of the movement of the guidance set, can be achieved by rotating the reflection mirror 15 in the ratio of 1:1 to the gyroscopic displacement around the X-axis and in the ratio of 1:½ to the gyroscopic displacement around the Y-axis respectively. In addition, the twist of the optical axis caused by the rotation of the reflection mirror 15 is completely corrected by the odd reflection prism 11.

On the other hand, before the launching of the flying vehicle, an electric motor 29 is driven by a warm up signal 43. The motor 29 serves to rotate the odd reflection prism 7 and the polygonal prism 5 at the predetermined speed through gears 30, 31 and 32 and a gear box 38. This rotation speed is detected by a rotation speed detector 39, and the output of which is fed back to a motor control circuit 40 to stabilize the rotation speed of the motor 29.

When a signal 35 from a reference oscillator or the flying vehicle is applied to the motor control circuit 40 with the aid of a launching standby signal 42, the signal 35 is compared with the negative feedback signal therein, and the rotation speed of the motor 29 is controlled through a servo amplifier 41 so that the difference between these two signals is eliminated.

A position reference detector 33 operates to detect as a position reference time the instantaneous time when the light beam 6 starts moving. An angle reference detector 34 operates to detect as an angle reference time whenever the spiral scanning light beam 8 crosses a reference axis (determined by a particular angle in one revolution, for instance OF). The detected output signals are introduced into a synchronization circuit 36, and when a launching signal 37 is generated upon launching, a position reference signal 27 and an angle reference signal 28 are delivered to the flying vehicle and stored therein.

Upon generation of the launching signal 37, the signal 35 from the reference oscillator is stored in the motor control circuit 40, and after the launching of the flying vehicle the motor 29 is controlled in synchronization with the signal thus stored. On the other hand, upon generation of the launching signal 37, the light beam expanding device 13 is controlled through a gear 45 by an electric motor 44 in response to the lapse of time after the launching of the flying vehicle.

Thus, in the flying vehicle as launched, the position reference signal 27 and angle reference signal 28 thus stored, and a light reception signal received by a photo detector 23 are processed by a signal processing device 24, whereby a displacement D and a correction direction θ are obtained. This data is delivered to an autopilot 25 to provide a steering signal 26, whereby the position of the flying vehicle is corrected to the center of the light beam.

With reference FIGS. 3(A) through 3(E), generation of the position reference time by the position reference detector 33, generation of the angle reference time by the angle reference detector 34, and the mutual relationships in rotation center between the polygonal prism 5 and the odd reflection prism 7 will be described.

It is assumed that the odd reflection prism 7 is revolved at n revolution per second (hereinafter abbreviated as "r.p.s." when applicable), while the polygonal prism 5 is revolved at n/N r.p.s as the speed is reduced by the gear box having a gear reduction ratio N, and the polygonal prism 5 has W angles (W being an even number). When the polygonal prism 5 is at a position A, the light beam 4 is refracted thereby to appear as the light beam 6 at a position $A_1$. When the prism 5 is at a position B, the light beam 4 is refracted to appear as the light beam 6 at a position $B_1$. Thus, when the prism 5 is revolved continuously, the light beam 6 is repeatedly moved between the positions $A_1$ and $C_1$. If the polygonal prism 5 is turned by one revolution, the repetitive movement of the light beam 6 is effected W times, and therefore the number of repetitions times is n.W/N times per second.

On the other hand, the light beam 6 at the position $A_1$ passes through the odd reflection prism 7 and appears as the light beam 8 at a position $A_0$; the light beam 6 at the position $B_1$, as the light beam 8 at a position $B_0$; and the light beam 6 at the position $C_1$, as the light beam 8 at a position $C_0$. On the other hand, the odd reflection prism 7 is revolved at n r.p.s., as was described above. Therefore, if it is assumed that the rotation angles of the prism 5 from the position A to the position B and also from the position B to the position C are equal to an angle $\delta°$, while the prism 5 revolves through $\delta°$, the prism 7 revolves through N $\delta°$. In this case, the light beam passing through the odd reflection prism 7 is displaced between the positions $A_0$ and $B_0$, and $A_0$ and $C_0$, and it is revolved by $2N \delta°$ in the same direction as the rotation direction of the odd reflection prism. Therefore, the revolution speed of the light beam 8 is 2n r.p.s.

If the gear reduction ratio N of the gear box 38 is greater than W/2 (N>W/2), that is the revolution speed of the odd reflection prism 7 is higher than that of the polygonal prism 5, a spiral light beam 8 is obtained as shown in FIG. 3(D). On the other hand, if N<W/2, that is, the revolution speed of the prism 7 is lower than that of the prism 5, a radial light beam 8 is obtained, as shown in FIG. 3(E).

The position reference detector 33 operates to detect the time when the light beam 6 starts its movement, that is, the time when the light beam 6 appears at the position $A_1$, thereby to define a position reference time. As the number of times of repetition of the light beam 6 is (n·W/N) times per second, the position reference time occurs (n·W)/N times per second and the time interval is N/(n·W) second. On the other hand, the angle reference detector 34 operates to detect the time when the light beam 8 crosses with the reference axis, for instance OF, thereby to define an angle reference time. Since the light beam 8 makes two revolutions while the odd reflection prism 7 makes one revolution, it crosses with the reference axis OF two times. Therefore, the angle reference time occurs 2n times per second, and the time interval is ½n second.

One example of a control system for the guidance system shown in FIG. 2 will be described in detail in the order of operations with reference to FIG. 4.

Upon application of the warm up signal 43 after the flying vehicle has been loaded on the launcher, a signal from a revolution reference generator 46 is applied through a switching circuit 47 to a comparison circuit 48, the output 49 of which is changed into an analog voltage by a digital-to-analog converter 50 and is applied to the servo amplifier 41. The output of the servo amplifier 41 is employed to operate the motor 29. The revolution of the motor 29 is detected by a revolution detector 51 which produces pulses M times whenever the odd reflection prism 7 makes one revolution. These pulses are converted into a coded signal of M·n pulses per second, (hereinafter abbreviated as "p.p.s" when applicable) which is delivered to the comparison circuit 48.

Upon application of the standby signal 42, electric power is supplied to the flying vehicle, and a reference oscillator 63 starts its oscillation at a rate of R p.p.s. The output of the oscillator 63 is applied to a counter circuit 53, where the output of R p.p.s. is converted into a coded signal of R/K p.p.s. (where K is a constant). The coded signal is introduced into a memory device 54. When the standby signal is applied to the memory device 54, the above-mentioned signal introduced thereinto is delivered to the switching circuit 47 as it is. When the standby signal 42 is applied to the switching circuit 47, the signal from the revolution reference generator 46 is separated out, and the output of the memory device 54 is delivered to the comparison circuit 48, which delivers a difference signal 49 between the signal of R/K p.p.s. and the signal of M·n p.p.s. to the digital-to-analog converter 50, and the revolution speed of the motor 29 is controlled so that the difference is zeroed. Thus, the signal of m·n P.P.S. coincides with the signal of R/K p.p.s., and the reference oscillation 35 of the flying vehicle is synchronized with the revolution speed of the motor 29. As the difference signal 49 approaches to zero, a synchronization indicator 55 indicates synchronization. Upon confirmation of this indication, a launching signal 37 is produced. When this launching signal is applied to the memory device 54, the output of R/K p.p.s. of the counter 53 obtained by coding the output 35 at the instant of that application is stored in the memory device 54, and thereafter the coded signal thus stored is applied to the switching circuit 47.

On the other hand, the position reference detector 33 produces a pulse every N/(n·W) seconds starting from the time when the light beam 16 is positioned at the center, while the angle reference detector 34 produces a pulse every ½n seconds starting from the time instant when the light beam 16 passes through the reference axis. The outputs of these detectors are shaped into rectangular pulses by pulse shaping devices 56 and 57, respectively. The outputs of the pulse shaping devices 56 and 57 are applied to an AND circuit 58. The output of the pulse shaping device 56 is provided through the AND circuit 58 only when it coincides with the output of the pulse shaping circuit 57. Therefore, the accuracy of pulse position in the pulse shaping device 56 is improved 2N/W times. The outputs of the AND circuit 58 and the pulse shaping device 57 are introduced into switching circuits 59 and 60, respectively. Upon application of the launching signal 37, reference signals 27 and 28 are produced by the switching circuits 59 and 60, respectively. The launching signal 37 is applied also to a voltage generator 61 to produce a voltage, which is amplified by an amplifier 62 to operate the motor 44. The revolution of the motor 44 is transmitted through the gear 45 to the light beam expanding device 13, so that the radiation angle of the light beam 16 varies according to the lapse of time after the flying vehicle has been launched. Therefore, no matter where the flying vehicle is the radius of the scanning area covered by the light beam 16 is a constant value r.

In the flying vehicle upon generation of the launching signal 37, connectors 78 are disconnected, whereupon the position reference signal 27 and the angle reference signal 28 are applied respectively to a position reference generator 64 and an angle reference generator 65. Starting from this instant, the position reference generator 64 produces a pulse 66 once every KMN/W pulses, while the angle reference generator 65 produces a pulse 67 once every KM/2 pulses.

On the other hand, a light reception pulse received by the photo detector 23 is chaped by a pulse shaping device 68 into a pulse 69. A displacement counter 70, upon reception of the pulse 66, is set the reference oscillation signal 35 to zero, and starts its counting operation, but suspends the counting operation upon reception of the pulse 69. The count value obtained at the time of suspending the counting operation is stored in a memory device 71. If the number of pulses stored in the memory device 71 is assumed to be $P_D$, $P_D$ can be represented by KWN/Wr D. That is, $P_D = K_D D$ ($K_D$: constant). This value is introduced into a digital-to-analog converter 72. On the other hand, an angle counter 73, upon reception of the pulse 67, is set the reference oscillation signal 35 to zero, and starts its counting operation, but suspends the counting operation upon reception of the pulse 69. The count value obtained at the time of suspending the counting operation is stored in a memory device 74. If the number of pulses stored in the memory device 74 is assumed to be $P_\theta$, $P_\theta$ can be represented by KM/2.360 $\theta$. That is, $P_\theta = K_\theta \theta$ ($K_\theta$: constant). This value is introduced into a digital-to-analog converter 75. The autopilot 25 receives $P_D(76)$ and $P_\theta(77)$ from the converters 72 and 75, respectively, and operates to determine a steering magnitude and a steering direction so that the flying vehicle is at the center of the light beam 16, and to produce steering signals 26.

Thus, the flying vehicle, sensing the displacement and angle with respect to the center of the light beam 16, can fly on the center of the light beam at all times.

Means for increasing the revolution speed of the light beam will be described with reference to FIG. 5. The reception intervals of reception signals necessary for guiding the flying vehicle are determined by the response characteristic of the flying vehicle itself, and the revolution speed of the light beam is determined by the scanning area. However, as it is limited to mechanically increase the revolution speed, the following method is employed in this invention for increasing the revolution speed of the light beam; that is, the odd reflection prism remote from the light source is rotated in the direction opposite to the direction of rotation of the odd reflection prism closer to the light source. By practicing this method for the odd reflection prism 7 in FIG. 2, the revolution speeds of the prisms can be relatively low.

The light beam 6 at a position H passes through the odd reflection prism 7, and appears as the light beam 8 at a position $H_o$. This light beam 8 passes through an odd reflection prism 79 and appears as a light beam 80 at a position $H_1$. Similarly, the light beam 6 at a position I passes through the prism 7 and appears as the light beam 8 at a position $I_o$. This light beam 8 passes through the prism 79 and appears as a light beam 80 at a position $I_1$. In this case, the prism 7 revolves at a speed of n r.p.s. (revolution per second), while the prism 79 revolves at the same speed (n r.p.s.) in the opposite direction. If the rotation angle of the prism 7 is $\epsilon°$, that of the prism 79 is also $\epsilon°$ but in the opposite direction. Therefore, in this case, the light beam 6 allowed to pass through the prism 7 is displaced for the distance between the positions $H_o$ and $I_o$, and is revolved through $2\epsilon°$ in the same direction as the rotation direction of the prism 7. Thus, the light beam 8 revolves at a rate of 2n r.p.s. In addition, the light beam 8 allowed to pass through the prism 79 is displaced for the distance between the positions $H_1$ and $I_1$, and is revolved through $4\epsilon°$ in the same direction as the rotation direction of the prism 79. Thus, the light beam 80 is revolved at a rate of 4n r.p.s.

Means for gradually increasing the diameter of a light beam which is maintained thin at its starting point and is repeatedly moved from one end to the other end, for instance vertically or horizontally, will be described with reference to FIG. 6.

In guiding the flying vehicle to the center of the light beam, a method in which a scanning area is covered by a light beam which is thin in the vicinity of its center and becomes heavier, or increases its diameter as it is displaced outward from the center, is advantageous than a method in which the scanning area is covered by a light beam whose diameter is maintained constant, in that the number of light beams covering the scanning area can be reduced without lowering the guiding accuracy in the vicinity of the center of the light beam. This advantageous method can be practiced by combination of a non-spherical concaved lens and a non-spherical convexed lens in each of which no curvature exists in the vicinity of the center, but the curvature is decreased gradually toward the periphery. This combination can be applied to the light beam 6 in FIG. 2.

As each of a non-spherical concaved lens S and a non-spherical convexed lens T has no curvature in the vicinity of its center, a light beam 6 at a position a is not refracted by the lenses, and appears as a light beam 81 at a position $a_1$. A light beam 6 at a position b is refracted by the lens S (with a focal distance $f_1$ in this case) and is further refracted by the lens T (with a focal distance $f_3$ in this case), and appears as a light beam 81 at a position $b_1$ which is increased in sectional area. Similarly, a light beam 6 at a position c is refracted by the lens S (with a focal distance $f_2$ in this case) and is further refracted by the lens T (with a focal distance $f_4$ in this case), and appears as a light beam 81 at a position $c_1$ which is further increased in sectional area.

In the above description, the spiral scanning light beam 8 is obtained by the use of a polygonal prism and an odd reflection prism such as those 5 and 7 shown in FIG. 3. However, such a spiral scanning light beam can be obtained also by the use of a vibrating plane mirror such as a mirror in a galvanometer as shown in FIG. 7.

Figure 7:
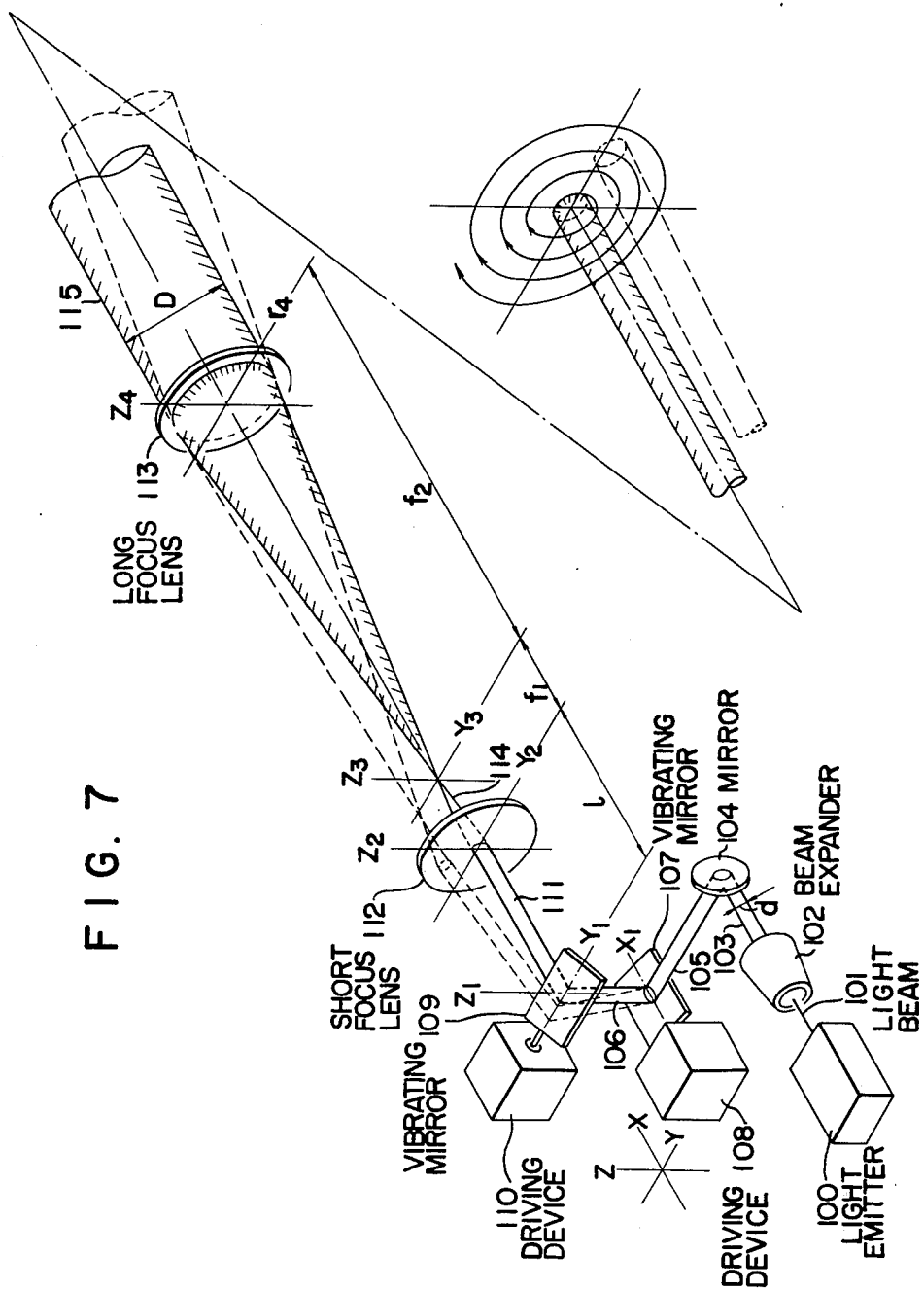
FIG. 7 is an illustration of a light beam disposed with vibrating mirrors which is an alternate system instead of the system illustrated in FIG. 2.

In FIG. 7, a parallel, thin light beam 101 emitted by a light emitter 100 is passed through a beam expander 102, and the thin light beam is expanded to several times of beam diameter, and this beam 103 is directed to a reflection mirror 104, and a light beam 105 reflected by this mirror 104 is directed to a vibrating plane mirror 107. As this mirror 107 is vibrated by a driving device 108 around the $X_1$-axis in sine wave, a light beam 106 reflected by the vibrating mirror 107 is scanned on the Y-Z plane. This scanning light beam 106 is directed to a vibrating plane mirror 109 which is vibrated by a driving device 110 around the $Y_1$-axis in cosine wave. The scanning light beam 106 is reflected by the vibrating mirror 109 and furthermore is scanned on the X-Z plane. Therefore, a light beam 111 is scanned on the X-Y plane and the X-Z plane by the sine wave vibrating mirror 107 and the cosine wave vibrating mirror 109, respectively. As a result, the light beam 111 is circularly scanned on the $Y_2$-$Z_2$ plane. Hence, when the amplitude of vibration of two mirrors is gradually increased from zero to suitable amplitude, the light beam 111 is spirally scanned on the $Y_2$-$Z_2$ plane. Thus, a spiral scanning light beam similar to that described before can be obtained.

The light beam 111 from the vibrating plane mirrors 107 and 109 is directed to a lens 112 whose focal distance is shorter than the focal distance of a lens 113 located in front of the lens 112, and is refracted by the lens 112. As a result, a light beam 114 forms a spot on the $Y_3$-$Z_3$ plane which is perpendicular to the optical axis (X-axis) and is at the focal point of the lens 112, the spot forming a spiral pattern on the $Y_3$-$Z_3$ plane.

The light beam which has formed the spot on the $Y_3$-$Z_3$ plane is expanded in sectional area, is directed to the lens 113 which is located at the position where the center of the exapnded light beams crosses with the optical axis (X-axis), that is located on the $Y_4$-$Z_4$ plane, and appears as a light beam 115 which is larger in sectional area, and carries out the spiral scanning. In this optical system, even if the incident angle of the light beam 111 with respect to the lens 112 is changed, the light beam 114 transmitted through the lens 112 can utilize the aperture of the lens 113 as much as possible. Therefore, the divergence angle of the light beam due to diffraction is reduced, which leads to the reduction of the diameter of the light beam at a long distance and an improvement in guiding accuracy.

If it is assumed that the diameter d of the light beam 103 is 5 mm, the focal distance $f_1$ of the lens 112 is 80 mm, the focal distance $f_2$ of the lens 113 is 560 mm, and the distance l between the scanning original point and the lens 112 is 91.5 mm, then the diameter D of the light beam 115 is 35 mm from the following Equation (B):

$$D = d \times (f_2/f_1) = 35 \text{ mm } \phi \quad (3)$$

The divergence angle $\Delta\theta$ of the light beam 115 due to diffraction is represented by the following Equation (4):

$$\Delta\theta = 1.22 \times (\lambda/D) \quad (4)$$

where $\lambda$ is the wavelength of the light beam.

Therefore, the divergence angle $\Delta\theta$ of the light beam 115 is:

$$\Delta\theta = 1.22 \times (0.55 \times 10^{-6})/(35 \times 10^{-3}) \text{ [rad]} = 0.0192 \text{ m rad} \quad (5)$$

In this case, the light beam is red light (0.55 μm). Therefore, the diameter of the light beam 115 at a position 5 Km remote from the launching position is approximately 130 mm. Thus, the diameter of the light beam is sufficiently small.

The center of the light beam 114 refracted by the lens 112, regardless of its incident angle with respect to the lens 112, crosses with the optical axis at a position at all times which is remote a distance S from the lens 112. This distance S is 640 mm from the following Equation (6):

$$1/l + 1/S = 1/f_1 \quad (6)$$

where $l > f_1$.

The lens 113 is disposed at a position, which is remote by ($f_1 + f_2 = 640$ mm) from the lens 112 as is apparent from FIG. 7. Therefore, even if the incident angle of the light beam 111 with respect to the lens 112 is varied, the light beam is allowed to utilize the entire aperture of the lens 113.

Figure 8A:
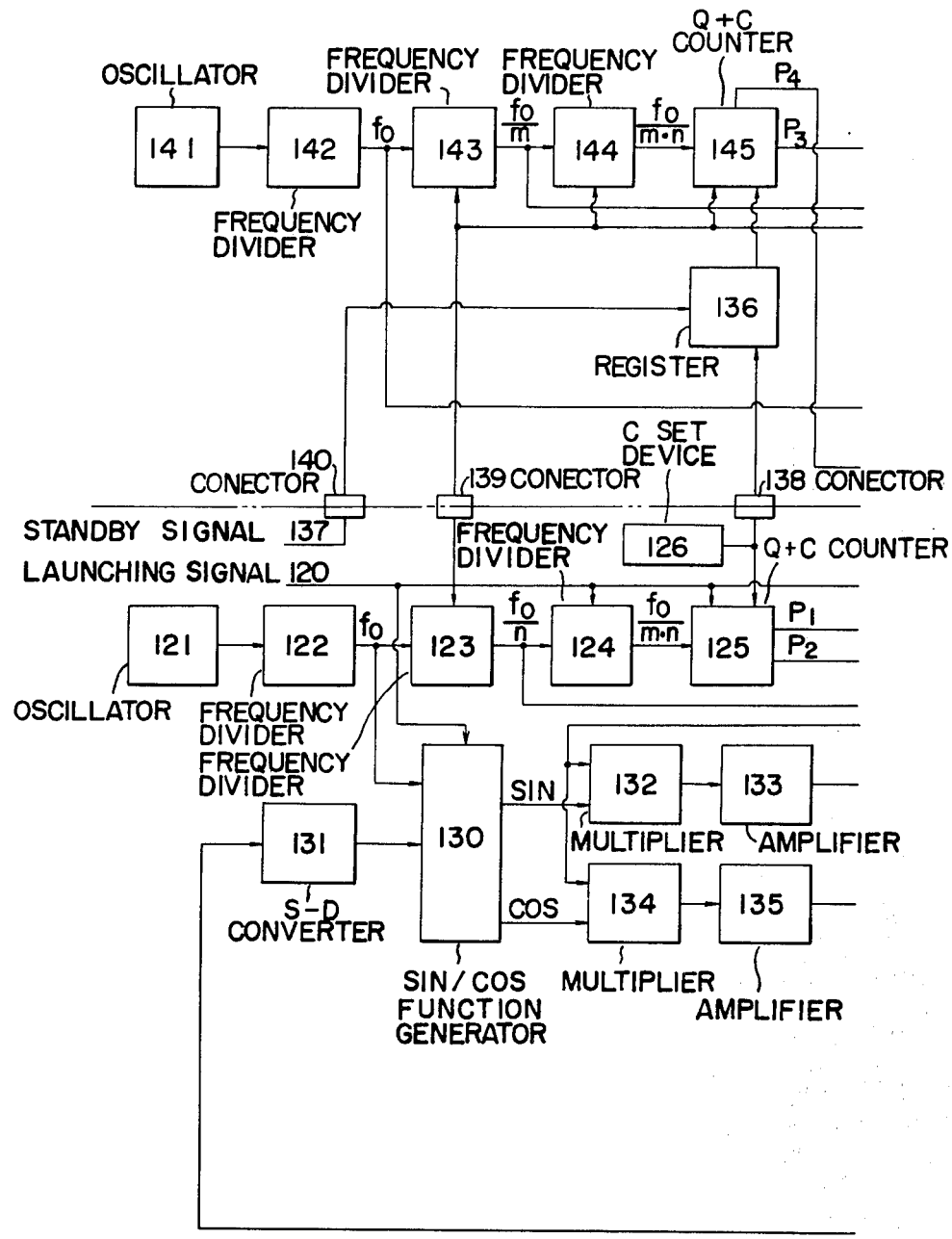
FIGS. 8(A) and 8(B) are two parts of a block diagram showing the light beam disposed with vibrating mirrors.
Figure 8B:
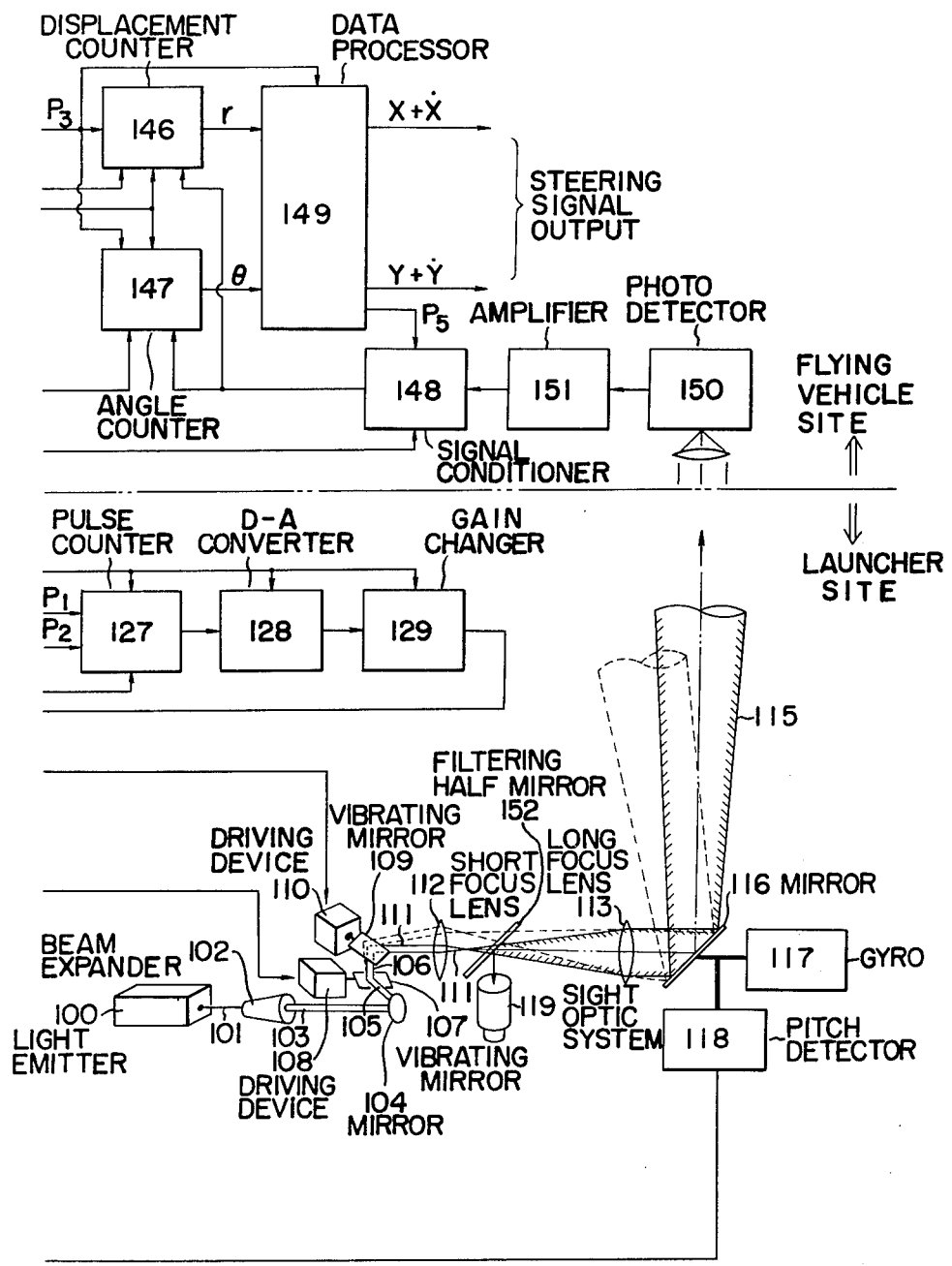

FIG. 8 is a block diagram for the vibration mirror system of FIG. 7 which is used for the guidance set and the flying vehicle. A oscillator 121 is a pulse generator. Pulses generated in the oscillator 121 are divided to reference frequency $f_o$ pps in a frequency divider 122, this reference frequency $f_o$ is divided to $f_o/n$ pps in a frequency divider 123 which is reset by launching signal 120, and furthermore $f_o/n$ pps signal is divided to $f_o/m \cdot n$ pps in a frequency divider 124 which is reset by the launching signal 120. A Q+C counter 125 reset by the launching signal 120 receives $f_o/m.n$ pps signal and generates two pulses of $P_1$ and $P_2$. $P_1$ is a pulse generated Q pulses period in the Q+C pulses described later and $P_2$ is serial pulses generated every Q+C pulses of $f_o/m.n$ pps. The value of Q is preset value and C is set by a C set device. A pulse counter 127 reset by the launching signal 120 counts the $f_o/n$ pps pulses, and this counter is started by launching signal 120 and $P_2$, and the counter 127 is stopped by $P_1$. The pulse counter 127 sends counter value of every count to a D-A converter 128. The output digital signal of the pulse counter 127 is converted to an analog signal in the D-A converter 128. The analog signal is sent to a gain changer 129, and magnitude of the analog signal is adjusted automatically for change the scanning diameter of the light beam correspond with flight elapsed time of flying vehicle after launch. The scanning diameter of light beam is determined by the magnitude of the gain changer 129 output.

On the other hand, $f_o$ pps is sent to a SIN/COS function generator 130, sine function signal and cosine function signal are generated in this function generator 130. An angle of the SIN/COS function generator is defined in radian decided mxn value correspond to $2\pi$ radian. Then, resolution of the angle of the SIN/COS function generator is 2 $\pi$/m·n radians, and 2 $\pi$/m·n radians correspond to one pulse of $f_o$ pps, SIN/COS function generator is reset to zero with the launching signal 106 and started by the launching signal 106 and furthermore the start angle is set by output signal of a S-D converter 131 to adjust ROLL angle. The S-D converter 131 receives synchro signal and converts to digital signal. SIN output is multiplied with the output of the gain changer 129 in a multiplier 132 to get a variable amplitude of $f_o/m \cdot n$ Hz signal. This signal is amplified in an amplifier 133 to drive the driving device 110. COS output is multiplied with output of the gain changer 129 in a multiplier 134 to get a variable amplitude of $f_o/m \cdot n$ Hz signal. This signal is amplified in an amplifier 135 to drive the driving device 108.

Light beam in FIG. 8 is same beam described in FIG. 7 except following. Light beam output from the lens 113 is directed to a stabilized mirror 116 to stabilize the light beam 115 in the area. Stabilized mirror 116 is connected mechanically to a gyro 117, and driven pitch and yaw directions. Angle of pitch direction displacement is detected by pitch detector 118 as a synchro signal to get the adjustment signal of ROLL reference angle because ROLL reference angle is shifted by displacement of pitch direction of the mirror 116. Visible optic included in the light beam 115 passes the lens 113, is reflected by a filtering half mirror 152 and directed to a sight optic system 119. In the sight optic system 119, image of target appears for the operator of flying vehicle.

The block diagram in the flying vehicle is described as follow. The value of the C set device 126 is memorized through a quick disconnect connector 138 in a register 136 by the standby signal 137 through a quick disconnect connector 140, and counting value of a Q+C counter 145 is set by output signal of this register 136. In moment of launching signal is generated, all circuits in the flying vehicle are reset by the launching signal through a quick disconnect connector 138 and flying vehicle is launched from launcher simultaneously. The quick disconnect connectors 138, 139 and 140 are disconnected simultaneously to launching. A oscillator 141 is a same frequency oscillator to the oscilator 121 within a little error. Frequency of the oscillator 141 is divided in a frequency divider 142 to get $f_o$ pps pulses. $f_o$ pps is divided to $f_o/m$ pps in a frequency divider 143 reset by the launching signal 120, and $f_o/m$ pps is divided to $f_o/m \cdot n$ pps in a frequency divider 144. $f_o/m \cdot n$ pps signal to sent to a Q+C counter 145 in which generate two pulses of $P_3$ and $P_4$. $P_3$ is starting pulses for a displacement counter 146 and an angle counter 147. $P_4$ is a gating pulses for a signal conditioner 148 to send the output within the Q pulses counting period of the Q+C counter 145. The displacement counter 146 is operated the counter operation to count the $f_o/m$ pps signal by the launching signal 120, and this counter 146 is started with start of the Q+C counter 145, stopped by output signal of the signal conditioner 148, output of a displacement data $\gamma$ to a data processor 149, and reset by $P_3$ pulse of the Q+C counter 145 in case of no output from the signal conditioner 148. An angle counter 147 is operated the counter operation to count the $f_o$ pps signal by the launching signal 120, and this counter 147 is started with start of the Q+C counter 145, repeats the count of m·n pulses, number of K illustrated in FIG. 10 is set automatically stopped by output signal of the signal conditioner 148, sends a angle data $\theta$ to the data processor 149, and reset by $P_3$ pulse of the Q+C counter 145 in case of no output from the signal conditioner 148.

In the data processor 149, steering signal $X+\dot{X}$ and $Y+\dot{Y}$ is generated by computing $\gamma \sin\theta$ and $\gamma \cos\theta$ and differential calculus from the data of $\gamma$ and $\theta$.

A photo detector 150 receives the light beam 115, and sends the detect signal to a amplifier 151. This signal is amplified by the amplifier 151 and shaped to pulse wave. Output pulses of the amplifier 151 are supplied to signal conditioner 148, and can pass through the signal conditioner 148 under condition of period of $P_4$ and $P_5$. $P_5$ is existed under condition of that later output pulse from the amplifier 151 is within suitable timing difference $T_1 \pm D$ sec. in conjunction with $P_3$ against last output pulse to avoid the receiving signal from another launcher. $P_5$ and $T_1 \pm D$ sec. are shown in FIG. 10. By these operation, multiple launching can be performed against same or adjacent targets. Setting the value of C performs multiple launching. Different C is set for adjacent launcher.

FIG. 9 illustrates the relationship of $f_o$; m, n, Q, C, $\gamma$ and $\theta$ described in FIG. 8. SIN and COS signals can be got from the pulses of $f_o$ pps and one cycle is defined m·n pulses. Phase of SIN and COS signals are related to reference of angle data, and resolution of these signals in $2\pi/m \cdot n$ radians. Time of one cycle is $m \cdot n/f_o$ sec. because one cycle corresponds to m·n pulses of $f_o$ pps. Thus, time reference is able to replace number of pulses. $f_o/n$ pps, $f_o/m$ pps and $f_o/m \cdot n$ pps can be got from $f_o$ pps. RAMP output can be got from output of each counter value of $f_o/n$ in the Q pulse period. Maximum value of RAMP output is mxQ, resolution of RAMP output is R/m·Q if maximum scanning radius of area is defined to R. RAMP outputs of SIN and COS are obtained by multiplication of RAMP and SIN/COS signals, and spiral scanning pattern is performed by two axes scanning by 2 mirrors mounted on the drive devices which are drived by SIN/COS RAMP signals. $P_1$, $P_2$, $P_3$ and $P_4$ pulses are produced from counting of $f_o/m \cdot n$ pps signal.

Figures 10A, 10B:
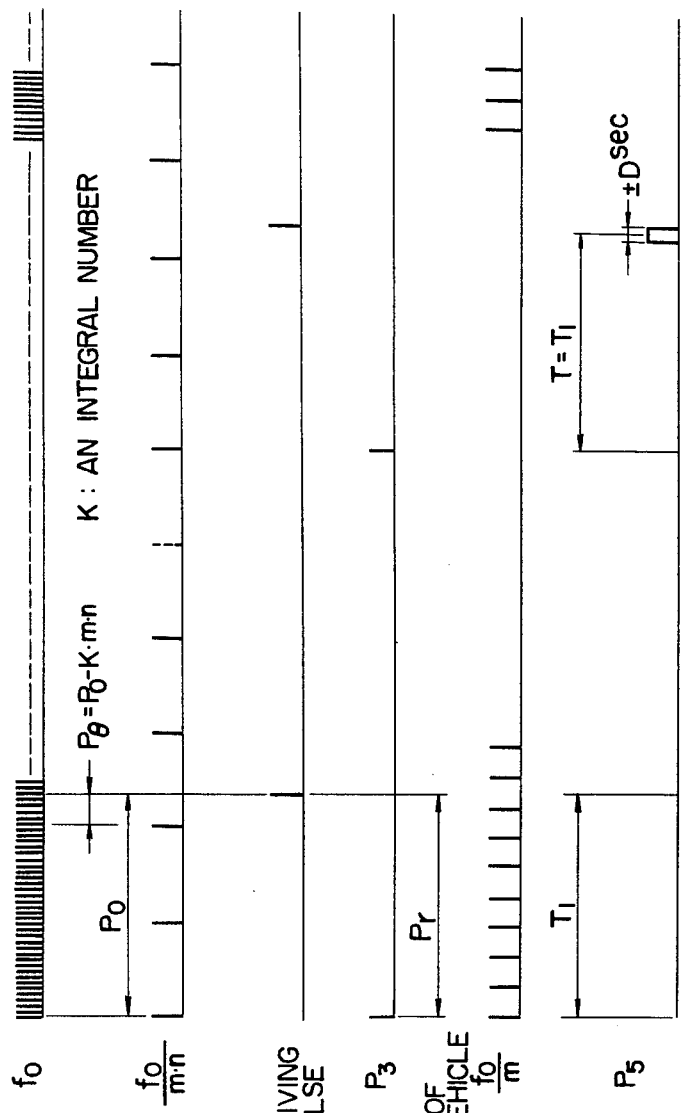
FIG. 10(A) is an illustration of the receiving position in the spiral scanning area.
FIG. 10(B) is a time chart of signals processing in the flying vehicle.

FIG. 10 illustrates the relationship of light beam receiving position and measuring data. When the flying vehicle is a position illustrated in FIG. 10 (A) and receives light beam, $\gamma$ and $\theta$ are measured by number of pulses $P_\gamma$ and $P_\theta$ illustrated in FIG. 10(B). Then $\gamma$ and $\theta$ are calculated as $$\theta = (2\pi P_\theta)/(m \cdot n) \text{ Radian} \tag{7}$$

$$\gamma = (R \cdot P_\gamma)/n \cdot Q \text{ m} \tag{8}$$

R = maximum radius of scanning beam in m.

For example, if the number of scanning is 20 revolutions and these scanning are performed in 1/20 sec. period, the time of need in one revolution of spiral is $1/20 \times 20 = 1/400$ sec. If the 512 is chosen for the number of m×n, one cycle of $f_o$ is $1/20 \times 20 \times 512$ sec, and pulse repitation frequency is 204.8 KHz. In case of the maximum scanning radius=10 m, n=8 and m=64, resolution of angle is $2\pi/512$ radians, resolution of RAMP output is $10/64 \times 20$ m, resolution of detecting position is 10/20 m, and value of Q is 20. The value of C is able to set freely, but this value is set between zero to 20 for maintain the suitable repitation rate of scanning.

As is apparent from the above description, according to this invention, a thin light beam from the light emitter is spirally or radially scanned by scanning the light beam in the radius direction from one end to the other, and while turning direction circularly, and the radiation angle of the light beam is suitably controlled, whereby the beam is directed to the receiver of the flying vehicle. Therefore, the present invention has a merit that while the intensity of the beam is maintained high, the scanning area is large enough for guiding the flying vehicle.

In the scanning with the light beam in the radial direction, the scanning may be carried out from one end to the other vertically or horizontally. In addition, the turning of the scanning direction allows the light beam to spirally or radially scan.

Furthermore, according to the invention, the radiation angle of the light beam is controlled with the lapse of time after the flying vehicle has been launched, so that the light beam scanning area on the receiver of the flying vehicle is maintained constant. Therefore, the flying vehicle can continuously receive a stable signal, and the control of the flying vehicle can be simplified.

In addition, the repetitive reference time in the spiral or radial scanning with the light beam is stored in the flying vehicle, and information on the displacement from the center of the light beam and also information on the displacement angle with the reference axis of the light beam on the basis of a period of time during which the receiver receives the light beam are applied to the flying vehicle. Therefore, it is unnecessary to provide an intricate process such as modulation of the light beam, and it is possible to obtain necessary information from the light beam itself. This is one of the merits of the invention.

In this case, the reference time generator in the flying vehicle is energized before it is launched. This generator is set to zero with the spiral repetition reference position or the radial repetition reference position immediately before the launching of the flying vehicle, thereby to start the time counting operation for displacement detection, and the time counting operation is suspended upon reception of the light beam, whereby the displacement can be determined from the counted time. On the other hand, the generator is set to zero immediately before the launching of the flying vehicle to start the time counting operation for displacement angle detection, and the time counting operation is suspended also upon reception of the light beam, whereby the displacement angle can be determined from the counted time.

What is claimed is:

1. A method for guiding a flying vehicle having a light receiver with a light beam comprising: spirally scanning a relatively thin light beam emitted by a light emitter provided at a launcher by scanning said light beam in a radial direction from one end to the other while turning the scanning direction circularly so as to aim said light beam at the light receiver of said flying vehicle; storing a repetition reference time of the scanning of said light beam in said flying vehicle; launching said flying vehicle; after said flying vehicle has been launched controlling the radiation angle of the scanning light beam according to the lapse of time after launching of said flying vehicle so as to maintain a scanning area of said scanning light beam on said light receiver constant; and guiding said flying vehicle to be on the center of said light beam according to information on a displacement of said flying vehicle from the center of said light beam and information on a displacement angle from a reference axis of said light beam determined from a period of time during which said light receiver receives said light beam.

2. A method as claimed in claim 1, in which the repetition rate of the spiral scanning is determined by setting the rest time between the end of a spiral scanning and the start of the next spiral scanning; and the reception of a signal from another launcher is avoided by receiving only a specified beam pulse which is within the short time interval defined as the center of the rest time interval.

3. A method for guiding a flying vehicle using a system including a light receiver in the flying vehicle, a light emitter at a launch site for emitting a stationary relatively thin light beam, and scanning means for scanning the light beam and including a polygonal prism and an odd reflection prism, said method comprising: positioning the polygonal prism to receive the stationary light beam; rotating the prism to radially scan the light beam; positioning the odd reflection prism to receive the radially scanning light beam; rotating the odd reflection prism to rotate the radially scanning light beam and thereby develop a spirally scanning light beam; directing the spirally scanning light beam toward the light receiver of the flying vehicle; storing a repetition reference time of the scanning of the light beam in the flying vehicle; launching the flying vehicle; after the flying vehicle has been launched controlling the radiation angle of the scanning light beam according to the lapse of time after launching of the flying vehicle so as to maintain a scanning area of the scanning light beam on the light receiver constant; and guiding the flying vehicle to be on the center of the light beam according to information on a displacement of the flying vehicle from the center of the light beam and information on a displacement angle from a reference axis of said light beam determined from a period of time during which the light receiver receives the light beam.

4. A method for guiding a flying vehicle using a system including a light receiver in the flying vehicle, a light emitter at a launch site for emitting a stationary relatively thin light beam, and scanning means for scanning the light beam and including a pair of planar mirrors, a short focus lens and long focus lens, said method comprising: expanding the stationary light beam by several diameters and directing the expanded light beam to a first of the planar mirrors; positioning the second of the planar mirrors relative to the first planar mirror for receiving the expanded beam reflected from the first planar mirror; vibrating the first and second mirrors about respective mutually perpendicular axes with respective sinusoidal and cosinusoidal displacements so that a spirally scanning beam is reflected from the second planar mirror; directing the spirally scanning light beam toward the light receiver of the flying vehicle and through the short and long focus lenses in that order; storing a repetition reference time of the scanning of the light beam in the flying vehicle; launching the flying vehicle; after the flying vehicle has been launched controlling the radiation angle of the scanning light beam according to the lapse of time after launching of the flying vehicle so as to maintain a scanning area of the scanning light beam on the light receiver constant; and guiding the flying vehicle to be on the center of the light beam according to information on a displacement of the flying vehicle from the center of the light beam and information on a displacement angle from a reference axis of said light beam determined from a period of time during which the light receiver receives the light beam.

* * * * *